Oct. 29, 1968 J. HAUS 3,408,541
SEMICONDUCTOR DEVICE HAVING A HOUSING AND A SEMICONDUCTOR
MEMBER DISPOSED IN A FRAME WITHIN THE HOUSING
Filed Aug. 25, 1965 2 Sheets-Sheet 2
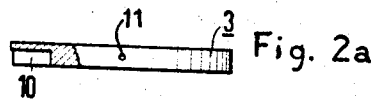
Fig. 2a
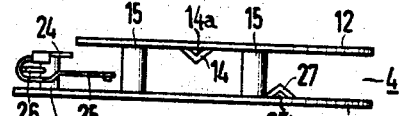
Fig. 2b
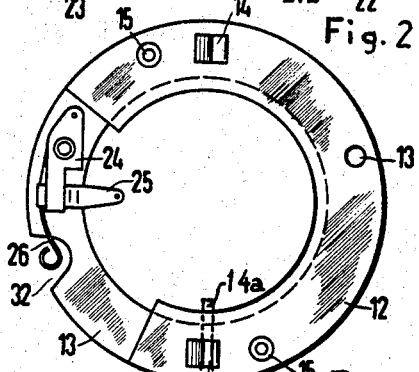
Fig. 2c
Fig. 2d
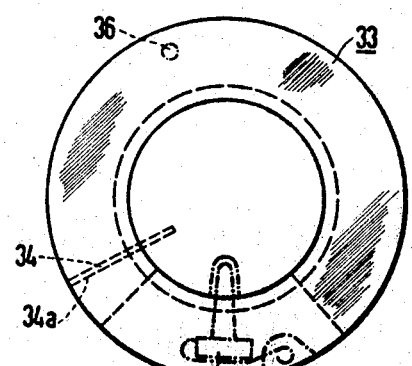
Fig. 4a
Fig. 4
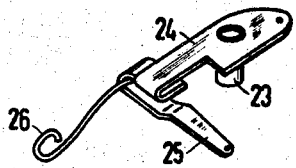
Fig. 3

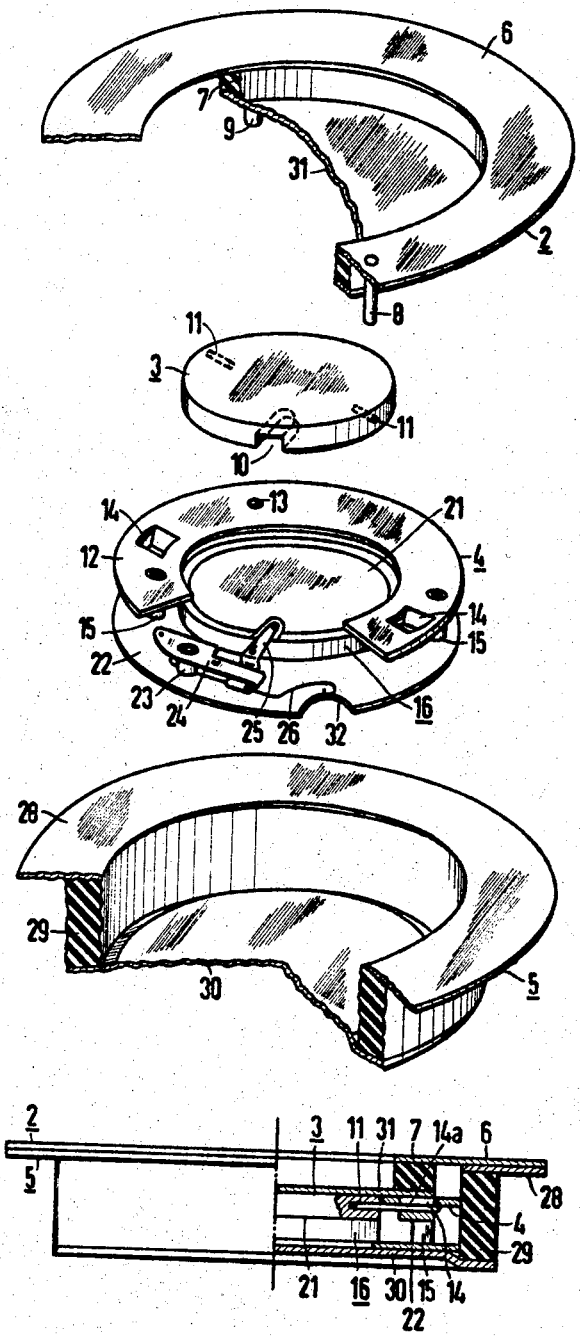

United States Patent Office 3,408,541
Patented Oct. 29, 1968

3,408,541
SEMICONDUCTOR DEVICE HAVING A HOUSING AND A SEMICONDUCTOR MEMBER DISPOSED IN A FRAME WITHIN THE HOUSING
Joachim Haus, Ebermannstadt, Germany, assignor to Siemens Aktiengesellschaft, Berlin, Germany, a corporation of Germany
Filed Aug. 25, 1965, Ser. No. 482,460
Claims priority, application Germany, Aug. 26, 1964, S 92,820
12 Claims. (Cl. 317—234)

ABSTRACT OF THE DISCLOSURE

Semiconductor device includes a housing, a semiconductor element enclosed in the housing, the semiconductor element including a disc-shaped body of semiconductor material having opposite flat faces, contact electrodes located on the flat faces, and frame means for the semiconductor element, the frame means being in close-fitting installation in the housing.

---

Semiconductor devices such as silicon rectifiers and silicon thyristors are known wherein a disc-shaped semiconductor element, constituting the rectifier or thyristor proper, is enclosed in a flat housing essentially consisting of a ceramic ring on the respective end faces of which foils of ductile metal having good electric current and heat conductivity, preferably silver, are firmly soldered. The semiconductor element consists of a disc-shaped semiconductor body of silicon, for example onto one flat side of which an aluminum foil is alloyed or indiffused. A support body consisting of a metal such as molybdenum, for example, whose thermal coefficient of expansion is close to that of the semiconductor body, is secured to the aluminum foil. In the case of a rectifier, electrodes of precious or noble metal having great area are deposited on the other flat side of the semiconductor body, whereas in the case of a thyristor, an electrode of noble metal having great area and an additional control electrode of relatively small area are deposited thereon. A carrier body of metal, for example, molybdenum, having a suitable thermal coefficient of expansion, is also located on this other flat side of the semiconductor body. The side of the carrier body facing the semiconductor body is silvered and, if necessary, is provided opposite the control electrode with a recess insulating this electrode from the carrier body. By tempering at suitable temperature, the noble metal surfaces on the semiconductor body and on the carrier body are caused to grow together firmly or coalesce. The carrier bodies are slidingly inserted into elevations of the metal foils soldered firmly to the insulating ring for fixing the position of the carrier bodies.

Before the carrier body is to be secured to the noble metal electrodes of relatively wide area by tempering, the semiconductor elements must be repeatedly tested and inserted in various measuring devices for this purpose. When being inserted and also when being tempered, damage to the surface of a semiconductor body can occur which can alter its electrical characteristics. Furthermore, the carrier body and the entire semiconductor element therewith are held only laterally by the elevations of the metal foils of the housing, and are not secured against twisting or torsion. The prevention of twisting is, however, most essential for semiconductor thyristors because for such devices, an additional control electrode is located on a flat side of the semiconductor element near the noble metal electrode of large area, and this control electrode must be protected against short-circuiting and must afford a good conductive contact.

It is accordingly an object of my invention to provide a semiconductor device which avoids the foregoing disadvantages of the known semiconductor devices and more particularly prevents twisting of the carrier body and the entire semiconductor element.

With the foregoing, and other objects in view, I provide, in accordance with my invention, a frame for a semiconductor element mounted thereon right after the element is formed, so that its surface can be tested as often as desired without damage and accordingly, if necessary, can be inserted in the housing of a semiconductor device with relative security against twisting. More specifically in accordance with my invention, I provide a semiconductor device with a disc-shaped semiconductor element enclosed in a housing, the element being provided on its flat side with contact electrodes, one of which is connected with an electrically conductive carrier body. In accordance with another feature of my invention, I provide a semiconductor element disposed in a frame that is installed flush in the housing.

Other features which are considered as characteristic for the invention are set forth in the appended claims.

Although the invention is illustrated and described herein as embodied in semiconductor device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is an exploded perspective view of an embodiment of a semiconductor device constructed in accordance with my invention.

FIG. 1a is a side view, partly in section, of the components of FIG. 1 in assembled form.

FIG. 2a is a side view partly broken away of the component shown second from the top in FIG. 1;

FIGS. 2b and 2c are respective side and plan views of the component shown third from the top in FIG. 1, with the semiconductor element removed;

FIG. 2d is a side view of the semiconductor element forming a component of the embodiment in FIG. 1;

FIG. 3 is a perspective view of a portion of the component shown in FIGS. 2b and 2c; and FIGS. 4a and 4b are respective plan and sectional views of another embodiment of the semiconductor device of my invention shown in substantially actual size.

Referring now to the drawings, and first particularly to FIGS. 1, 1a and 2a through 2d thereof, there is shown a semiconductor device comprising housing portions 2 and 5, a frame 4 insertable between the housing portions 2 and 5 and a disc-shaped semiconductor element 16 carried in the frame 4 and coverable by the cover disc 3. The semiconductor element 16, as shown in FIG. 2d, consists of the semiconductor body 19 proper, for example ple formed of silicon with alloyed-in or indiffused p-n transition zones, and a carrier body 17 attached to an aluminum electrode 17a that is alloyed to a flat side of the semiconductor body 19. The carrier body 17 consists of a metal having a thermal coefficient of expansion which is substantially as high as that of the semiconductor body 19, preferably molybdenum when the semiconductor body is made of silicon. A step-shaped or indented deposited layer 18 is located in the outer surface of the carrier body 17. A gold electrode 21 of relatively large surface area and an eccentrically located gold electrode 20 of relatively small surface area are mounted on the free flat side of the semiconductor body 19, as is the case, for example, with semiconductor controlled rectifiers (thyristors).

The carrier body 17 is mounted on the lower annular disc 22 of the frame 4 with the step-shaped deposit 18 extending into the opening thereof. The frame 4 consists of the annular discs 22 and 12 which are spaced from one another by two spacer supports 15 of insulating material, such as ceramic preferably. The annular discs 22 and 12 appropriately consist of a metal or an alloy having a thermal coefficient of expansion matching that of the insulating material, i.e. an iron-cobalt-nickel alloy for example when the insulating material is ceramic. The annular discs 12 and 22 are provided with solder holes and are firmly soldered to the previously metallized ends of the spacers 15. The semiconductor element 16 is secured against twisting at the annular disc 22 by a pin or peg 27b located in a bore 27a at the outer peripheral surface of the carrier body 17 and in a passage 27 on the annular disc 22, formed for example by making two parallel cuts in the disc 22 and depressing the material between the cuts. The annular disc 12, whose inner diameter is smaller than that of the annular disc 22, is formed with a sector-shaped notch so that the disc 12 is substantially C-shaped. A support 23 (FIG. 2b), for example of ceramic, is firmly soldered to the annular disc 22 at a location thereof opposite the notch in the annular disc 12. At the free end of this support 23 there is firmly soldered a coated layer or lamella 24 of an iron-cobalt-nickel alloy, the lamella 24 having a surface layer for example of hard silver solder. A spring contact 25, for example of copper, provided with a contact pin at the free end thereof, is secured by soft solder to the lamella 24. The spring contact 25 is suitably prestressed or biased into contacting engagement with the eccentrically disposed electrode 20 of the semiconductor element 16. A silver wire 26 is furthermore softly soldered to the lamella 24, the silver wire 26 being formed with an eye at a free end thereof located opposite a recess 32 in the annular disc 22.

As shown in FIG. 3, a strap joint connects both the lamella 24 and the spring contact 25. Both straps of the joint are disposed perpendicular to one another and are secured together by soft soldering or by spot welding. The silver wire 26 is soldered to the lamella 24 and is conductively connected with the spring contact 25 through the strap thereof. A cover disc 3 of a metal, such as molybdenum, preferably having a thermal coefficient of expansion substantially the same as that of the semiconductor body 19, is mounted in the central opening of the annular disc 12 on top of the semiconductor element 16. The cover disc 3 is provided with a recess 10 located opposite the electrode 20 and the spring contact 25, and is secured against twisting at the upper annular disc 12 of the frame 4 with pins 14a that are mounted in passages 14, formed similar to the passages 27, on the annular disc 12 and project into bores 11 located in the outer peripheral surface of the cover disc 3. The cover disc 3 is silvered on its lower side, as viewed in FIG. 2a, and is in contact engagement with the electrode 21 on the semiconductor element 16. The annular disc 12 is appropriately prestressed mechanically so as to press the cover disc 3 against the semiconductor element 16. This prestressing is produced by inserting the pins into the passages 14 and the bores 11, so that the annular disc 12 is pressed in a substantially upward direction. Both the cover disc 3 and the carrier body 17 can appropriately extend respectively above and below the annular discs 12 and 22 of the frame 4 as viewed in FIG. 2b.

As shown in FIG. 1, the housing portion 2 comprises a ring 7 of insulating material, preferably ceramic, to the upper side of which an annular disc 6 is secured with hard solder. The disc 6 consists of a metal or alloy having a thermal coefficient of heat expansion matching that of the ring 7, and preferably consisting of an iron-cobalt-nickel alloy. A foil 31 of ductile metal having a good electric current and heat conductivity, preferably silver, is secured with hard solder to the lower side of the ring 7. A pin 9 mounted under the ring 7 at the edge of the foil 31 is inserted in an opening 13 of the annular disc 12 and prevents twisting or torsion of the frame 4. The eye of the silver wire 26 is secured with soft solder to a pin 8 which is in turn secured with hard solder to the annular disc 6 so that the annular disc 6 is electrically connected with the spring contact 25 through the pin 8 and the wire 26.

As also shown in FIG. 1, the housing portion 5 consists of a ring 29 of insulating material, preferably ceramic, whose inner diameter is larger than the outer diameter of the ring 7 of insulating material, the frame 4 being located in the central aperture of the ring 29 and in flush alignment therewith. At the upper side of the ring 29 of insulating material, as viewed in FIG 1, which is of greater thickness in the axial direction thereof than the ring 7 of insulating material, there is secured with hard solder an annular disc 28 consisting of a metal or alloy, preferably consisting of iron-cobalt-nickel alloy, having a thermal coefficient of expansion matching that of the ring 29 of insulating material. A foil 30 of ductile metal, preferably silver, having good electric current and heat conductivity, is secured with hard solder to the lower side of the ring 29 as viewed in FIG. 1. The annual discs 6 and 28 of both housing portions 2 and 5 are welded one to the other.

The assembly of the semiconductor device of my invention is effected first by inserting the semiconductor element 16 between the annular discs 12 and 22 in the frame 4 and securing the same with a pin passed through the passage 27 into the bore 27a. The contact pin at the end of the spring contact 25, which is raised somewhat beforehand to permit insertion of the element 16, rests securely on the electrode 20. The passage 27 is located appropriately right near a spacer support 15 so that it does not hamper or obstruct the mounting or installation of the semiconductor element 16. The cover disc 3 is thereafter placed on top of the exposed surface of the semiconductor element 16 and secured in the center opening of the annular disc 12 with pins passed through the passages 14 and into the suitably aligned bores 11. Then the housing portion 2 is placed on top of the frame 4 so that the pin 9 extends into the opening 13 in the annular disc 12. The silver wire 26 is thereafter soldered to the pin 8. Finally, the housing portion 5 is put over the frame 4 and welded with the housing portion 2 at the annular discs 6 and 28. If necessary, a cooled copper ring can be placed on the annular discs 6 and 28 during the welding operation so as to dissipate the heat produced by the welding which might otherwise damage the semiconductor device.

If the disc-shaped semiconductor element 16 constitutes only a simple uncontrolled rectifier, it is not necessary to provide a base electrode on a flat side thereof, nor to contact the same. Therefore the spring contact 25 and means for fastening the semiconductor element 16 to the annular disc 22 can be dispensed with. The annular disc 12 then requires no sector-shaped notch, and the recess 10 in the cover disc 3 is superfluous. Since the frame 4 is no longer required to be securely mounted against twisting or torsion in the housing in the case of an uncontrolled rectifier, the pin or bolt 9 can also be dispensed with.

In the embodiment of the semiconductor device constructed in accordance with my invention that is shown in FIG. 4, the frame consists of a solid or massive ring 33 of insulating material, preferably ceramic or polytetrafluoroethylene, known in the trade by the tradename "Teflon." In the central opening of the ring 33, whose inner diameter is stepwise reduced, there is mounted the semiconductor element 16' having a carrier body 17' located at one side of the ring 33, as well as a metal cover disc 3', preferably of molybdenum, located on top of the semiconductor element 16 as viewed in FIG. 4.

Both the cover disc 3' and the carrier body 17' extend respectively slightly above and below the flat surfaces of the ring 33 as shown in FIG. 4. If, for example, a control electrode must be contacted on the semiconductor element 16', then as shown in FIG. 4a by the dot-and-dash line, a spring contact 37 is located in a recess formed in the ring 33. Both the carrier body 17' as well as the cover disc 3', which is accordingly provided with a recess opposite the spring contact 37 similar to the recess 10 of the component shown in FIG. 2a. are then secured with pins 34 mounted in lateral radially extending bores 34a through the ring 33 which engage in corresponding bores in the carrier body 17' and cover disc 3' respectively. An opening 36 is provided moreover in the surfaces of the ring 33 into which the pin 9 located on the housing portion 2 (FIG. 1) can be inserted so as to prevent relative twisting.

I claim:

1. Semiconductor device comprising a housing; a semiconductor element enclosed in said housing, said semiconductor element including a disc-shaped body of semiconductor material having opposite flat faces, and contact electrodes located on said flat faces; frame means for said semiconductor element, said frame means being in close-fitting installation in said housing and comprising a pair of ring-shaped metallic discs and spacer supports consisting of insulating material spacing said ring-shaped discs one from the other, one of said discs having a portion engaging a portion on one of the opposite faces of said semiconductor element for supporting the element.

2. Semiconductor device according to claim 1 wherein the material of said ring-shaped metallic discs has a thermal coefficient of expansion substantially matching the thermal coefficient of expansion of the insulating material of said spacer supports.

3. Semiconductor device according to claim 2 wherein said spacer supports consist of ceramic material and said ring-shaped discs of an iron-cobalt-nickel alloy.

4. Semiconductor device comprising a housing; a semiconductor element enclosed in said housing, said semiconductor element including a disc-shaped body of semiconductor material having opposite flat faces, contact electrodes located on said flat faces, and a carrier body electrically connected with one of said contact electrodes; frame means for said semiconductor element, said frame means being in tight-fitting installation in said housing; and comprising a pair of ring-shaped metallic discs, spacer supports consisting of insulating material spacing said ring-shaped discs one from the other, at least one of said ring-shaped discs having a radial passage alignable with a radial bore in said semiconductor element and a fastening pin extending trhough said passage and into said bore so as to prevent torsional movement between said one disc and said semiconductor element.

5. Semiconductor device according to claim 4 wherein said housing means comprises a pair of ring-shaped housing portions sandwiching said frame means therebetween, said housing portion being secured to each other against relative torsion, at least one of said housing portions carrying a pin extending in the axial direction thereof, one of said ring-shaped discs of said frame means being formed with a corresponding hole receiving said pin therein so as to prevent torsional movement between said frame means and said housing means.

6. Semiconductor device comprising a housing; a semiconductor element enclosed in said housing, said semiconductor element including a disc-shaped body of semiconductor material having opposite flat faces, contact electrodes located on said flat faces, and a carrier body electrically connected with one of said contact electrodes; frame means for said semiconductor element, said frame means being in tight-fitting installation in said housing; and comprising a pair of ring-shaped metallic discs, spacer supports of insulating material located between said annular discs for spacing the same one from the other, said carrier body being located at one face of said semiconductor element, being step-shaped in the axial direction thereof and having a portion of reduced cross section inserted into the central opening of one of said ring-shaped discs, and an electrically conductive cover disc located in the central opening of the other of said ring-shaped discs and engaging the other face of said semiconductor element, said other of said ring-shaped discs having at least one radially extending passage alignable with a radially extending bore in said cover disc and a fastening pin extending through said passage and into said bore.

7. Semiconductor device comprising a housing; a semiconductor element enclosed in said housing, said semiconductor element including a disc-shaped body of semiconductor material having opposite flat faces, contact electrodes located on said flat faces, and a carrier body electrically connected with one of said contact electrodes; frame means for said semiconductor element, said frame means being a close-fitting installation in said housing; and comprising a pair of ring-shaped metallic discs, spacer supports of insulating material located between said ring-shaped discs for spacing one from the other; said carrier body being located at one face of said semiconductor element, being step-shaped in the axial direction thereof and having a portion of reduced cross section inserted into the central opening of one of said ring-shaped discs, and an electrically conductive cover disc located in the central opening of the other of said ring-shaped discs and engaging the other face of said semiconductor element, said ring-shaped discs having respective radially extending passages alignable with respective radially extending bores in said carrier body and said cover disc and respective fastening pins extending through said passages and into said bores.

8. Semiconductor device according to claim 7 wherein said cover disc is formed with a recess, said other ring-shaped disc is formed with a sector-shaped notch opposite the recess of said cover disc, a spring contact is supported on an insulating support carried by said one ring-shaped disc and located between said ring-shaped discs, and an electrode is mounted on said other face of said semiconductor element, said electrode being located in said notch of said other ring-shaped disc in alignment with said recess in said cover disc and being in electrical contact with said spring contact.

9. Semiconductor device comprising a housing; a semiconductor element enclosed in said housing, said semiconductor element including a disc-shaped body of semiconductor material having opposite flat faces, contact electrodes located on said flat faces, and a carrier body electrically connected with one of said contact electrodes; frame means for said semiconductor element, said frame means being in close-fitting installation in said housing; and comprising a massive ring of insulating material having a central opening a stepwise increased inner cross section, said semiconductor element being inserted in said central opening with said carrier body located at one side of said massive ring, and an electrically conductive disc inserted in said central opening in engagement with said semi-conductor element at the other side of said massive ring.

10. Semiconductor device according to claim 9 wherein said massive ring insulating material is selected from the group consisting of ceramic and polytetrafluoroethylene.

11. Semiconductor device according to claim 9 wherein said electrically conductive disc forms a cover disc for said frame means, said cover disc and said massive ring of insulating material being formed with aligned recesses, a spring contact located in the recess of said massive ring, and an electrode mounted on a face of said semiconductor element opposite the recess of said cover disc, said spring contact being in electrical contact engagement with said electrode, said massive ring being formed with radially extending bores alignable with respective radially extending bores in said carrier body and said cover disc respectively for receiving respective fastening pins extensible through said aligned bores.

12. Semiconductor device according to claim 9 wherein said housing means comprises a pair of ring-shaped housing portions sandwiching said frame means therebetween, said housing portions being secured to each other against relative torsion, at least one of said housing portions carrying a pin extending in the axial direction thereof, said massive ring of insulating material being formed with a corresponding axially extending bore receiving said pin therein so as to prevent torsional movement between said massive ring and said secured housing portions.

References Cited
UNITED STATES PATENTS 3,030,557    4/1962    Dermit _____ 317—234
3,293,508    12/1966    Boyer _____ 317—234

JAMES D. KALLAM, *Primary Examiner.*